United States Patent [19]
Kershaw et al.

[11] Patent Number: 5,944,497
[45] Date of Patent: Aug. 31, 1999

[54] FAN ASSEMBLY HAVING AN AIR DIRECTING MEMBER TO COOL A MOTOR

[75] Inventors: Peter A. Kershaw; Marek Horski, both of London, Canada

[73] Assignee: Siemens Canada Limited, Mississauga, Canada

[21] Appl. No.: 08/977,985

[22] Filed: Nov. 25, 1997

[51] Int. Cl.$^6$ .................................................. F04B 17/03
[52] U.S. Cl. ........................................ 417/423.8; 417/368
[58] Field of Search .............................. 417/423.8, 354, 417/368; 310/67 R

[56] References Cited

U.S. PATENT DOCUMENTS

| | | | |
|---|---|---|---|
| Re. 34,268 | 6/1993 | Müller | 310/67 R |
| Re. 34,456 | 11/1993 | Harmsen et al. | 417/354 |
| 3,906,266 | 9/1975 | Cowman | 310/692 R |
| 3,961,864 | 6/1976 | Papst et al. | 417/354 |
| 4,399,379 | 8/1983 | Marks et al. | 310/62 |
| 4,554,491 | 11/1985 | Plunkett | 318/254 |
| 4,563,622 | 1/1986 | Deavers et al. | 318/254 |
| 4,682,065 | 7/1987 | English et al. | 310/90 |
| 4,686,400 | 8/1987 | Fujisaki et al. | 310/67 R |
| 4,698,542 | 10/1987 | Muller | 310/67 R |
| 4,838,760 | 6/1989 | Brackett | 416/93 R |
| 4,992,029 | 2/1991 | Harmsen et al. | 417/354 |
| 5,188,508 | 2/1993 | Scott et al. | 415/206 |
| 5,217,353 | 6/1993 | De Filippis | 417/368 |
| 5,654,598 | 8/1997 | Horski | 310/67 R |
| 5,818,133 | 10/1998 | Kershaw et al. | 310/67 R |

*Primary Examiner*—Charles G. Freay
*Assistant Examiner*—Robert Z. Evora

[57] ABSTRACT

A motor driven fan assembly is disclosed wherein a hub has a plurality of fan blades which extend radially outwardly therefrom and is fixed to an air cooled brushless motor for rotation, such that when the hub is rotatably driven by the motor, the fan blades create an atmospheric pressure differential defined by a higher pressure region downstream of the blades and a lower pressure region upstream of the blades. The hub has an opening dimensioned and located to communicate with cooling air openings in the motor. A cooling air directing plate is positioned axially upstream of the hub to define an air directing space with the motor and the hub, and the space communicates the lower pressure region with the higher pressure region through a cooling air path in the motor and the hub opening to cool the motor. A method of cooling such fan driving motor of the brushless type is also disclosed.

26 Claims, 4 Drawing Sheets

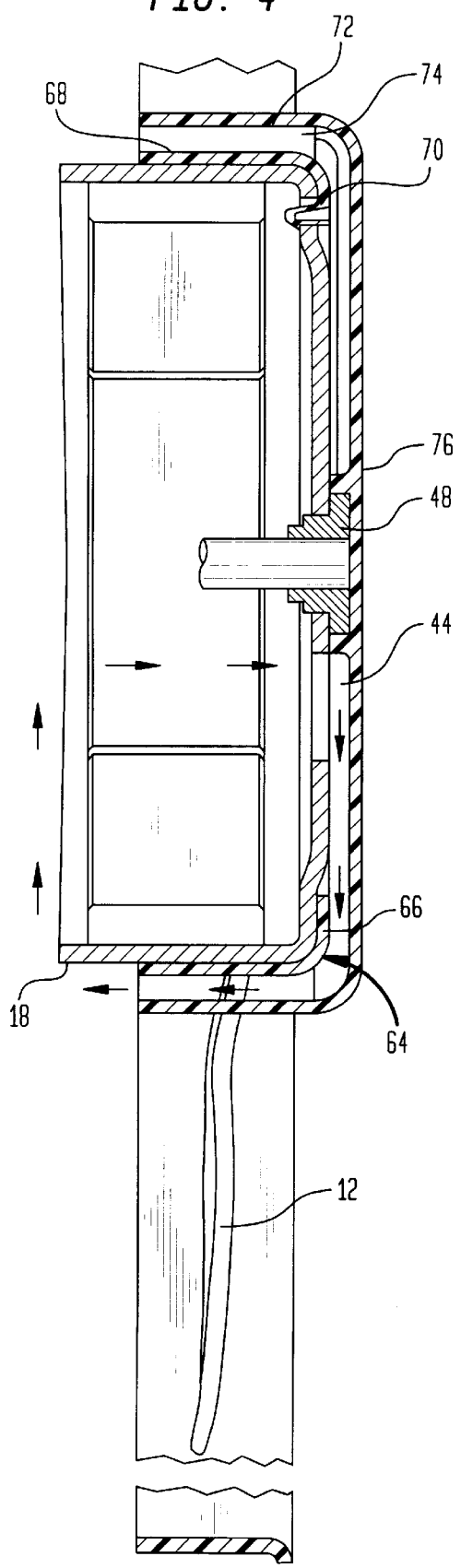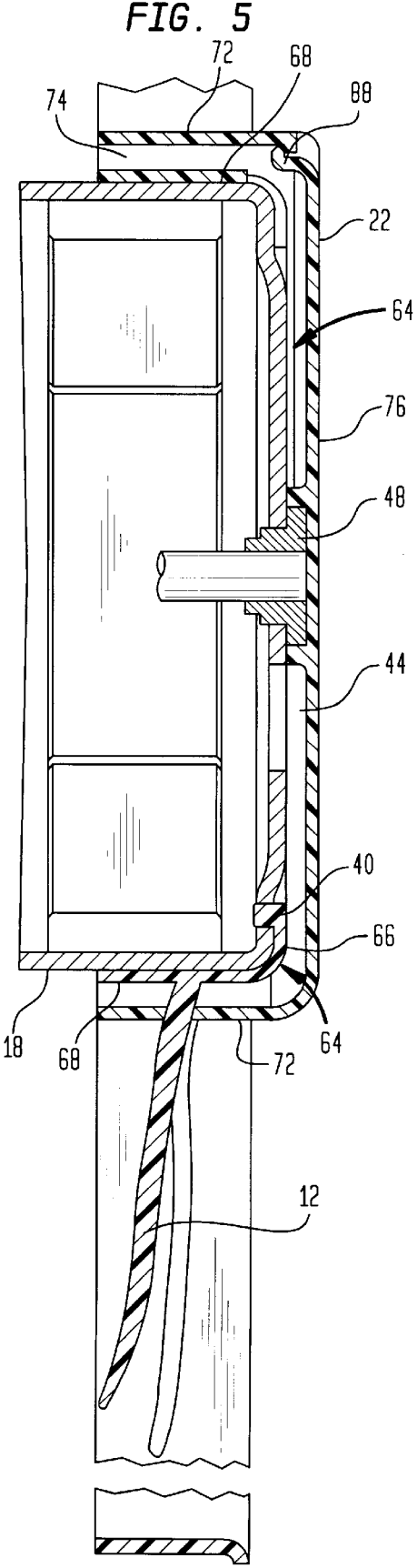

FAN ASSEMBLY HAVING AN AIR DIRECTING MEMBER TO COOL A MOTOR

BACKGROUND OF THE INVENTION

1. Field of the Invention

The present invention relates to fans of the type driven by brushless electric motors, particularly for use in motor vehicle engine cooling systems. In particular, the present invention relates to such fans having motor cooling features.

2. Description of the Related Art

Conventional electric motors may be generally characterized by a cylindrical housing which contains the various stationary and rotating components of the motor, as well as the associated electronic circuitry. In general, the housing is regarded as a combination of the rotor and a rear cover member. Such motors are generally utilized to drive a cooling fan in automotive applications wherein the motor is of the brushless-type and the fan is attached to a fan hub which is in turn attached to the rotor of the motor.

In general, the motor components are arranged in a relatively small space within the motor housing, thus resulting in the production of significant amounts of heat with little dissipation. In order to dissipate the heat, a cooling air path extends through the housing and a cooling device known in the art as a heat sink is provided with heat dissipating fins within the housing. In operation, the atmospheric air passes through the housing past the components and the fins of the heat sink and thereby cools the motor.

It has been found that the provision of a cooling air path through the motor housing is not always sufficient to produce the requisite cooling, particularly when the motor is used to rotatably drive a fan of considerable weight. In particular, the fan may contain any of a number of fan blades, generally between four and ten. In such instances, there is relatively substantial power consumption and significant amounts of heat generation within the brushless motor, which makes it desirable to provide additional cooling enhancement for the brushless motor. In this regard several alternatives may be considered, including increasing the spaces between the motor components, or increasing the cooling air flow through the motor, for example. In view of limited space requirements the first mentioned alternative is not viable.

U.S. Pat. No. 4,838,760 relates to a fan with motor cooling enhancement in which a plurality of arcuately shaped webs are provided on a fan hub for inducing the flow through the motor and through a plurality of openings formed in an axially extending wall of the hub. This arrangement utilizes additional energy to force the airflow, while its relatively complicated structure increases manufacturing costs. U.S. Pat. No. 5,217,353 relates to a fan for motor vehicles wherein a motor includes a casing having a stationary part with holes for taking in air from outside for ventilating the interior of the motor and a rotary part with holes which act as outlet ducts for the internal ventilation air. The cross-sections of the ducts decrease in the direction of the air-flow and open into the outside atmosphere in regions over which the air-flow induced by the fan wheel passes in operation.

Although the attempts to enhance air cooling of such motors have been effective to a limited extent, in general they have not achieved a level of volumetric air-flow and a satisfactory degree of cooling which is necessary to maintain the predetermined desired temperatures of such air cooled motors, particularly those of the brushless type. We have invented a fan assembly intended to be driven by such type of motor, wherein the actual fan assembly includes structure which enhances the flow of cooling air through a cooling air path extending through the motor and thereby provides for cooling of the motor by which it is rotatably driven.

SUMMARY OF THE INVENTION

Broadly stated, a motor driven fan assembly is disclosed which comprises a plurality of fan blades extending radially outwardly and having means to be fixed to a motor for rotation, such that when the blades are rotatably driven by the motor, they create an atmospheric pressure differential defined by a higher pressure region on one side of the blades and a lower pressure region on the other side of the blades. The higher pressure region is generally the downstream side and the lower pressure region is generally the upstream side. A cooling air directing member is positioned axially upstream of the motor to define an air directing space, the air directing space communicating the lower pressure region with the higher pressure region through a cooling air path in the motor to cool the motor.

In the preferred embodiment, the motor driven fan assembly comprises a hub having a plurality of fan blades extending radially outwardly therefrom and having means to be fixed to a motor for rotation. Thus when the hub and fan blades are rotatably driven, the fan blades create an atmospheric pressure differential defined by a higher pressure region downstream of the blades and a lower pressure region upstream of the blades. The hub further has an opening dimensioned and located to communicate with cooling air openings in the motor. A cooling air directing member is positioned axially upstream of the hub to define an air directing space with the motor and the hub, such that the air directing space is generally transverse to the axis of the motor and communicates the lower pressure region with the higher pressure region through a cooling air path in the motor and the hub opening to cool the motor. The hub comprises a base plate adapted to be torsionally fixed to the motor for rotation therewith, and a circumferential flange extending proximally from the base plate in an axial direction. The circumferential flange is configured and dimensioned to circumferentially surround at least a portion of the rotor in adjacent relation therewith.

The cooling air directing member disclosed is a plate spaced upstream of the rotor and connected to the radially extending rib members. The plate preferably has a substantially continuous inner surface portion such that with the exception of the presence of snap fit lugs to attach the plate to the rotor, substantially unimpeded air flow is permitted through the generally transverse air directing space. A plurality of snap-fit lugs is provided to attach the hub to the rotor and a plurality of torque studs is provided to transmit torque from the hub to the rotor for rotation therewith.

In another embodiment, the circumferential flange is comprised of a pair of circumferential individual concentric flange members, a first circumferential flange member being configured and dimensioned to circumferentially surround at least a portion of the motor in adjacent contacting relation therewith, and a second circumferential flange member being spaced radially outwardly from the first circumferential flange member to define an annular space therebetween. In this embodiment the fan blades are attached to the second circumferential flange member and extend radially outwardly therefrom. A plurality of support ribs are positioned between and connected to the first and second circumferential flange members, with the support ribs being spaced circumferentially with respect to each other to provide structural support for the circumferential concentric flange members. Also, an outer surface portion of the second circumferential flange member defines a portion of the cooling air directing path with the air directing plate and has an arcuate cross-sectional configuration adjacent the connection with the hub to provide a contoured configuration for the cooling air directing path. The hub and the cooling air directing plate are molded of a plastic material, such as polyester, nylon or the like.

In another embodiment, the fan blades are attached to the first and second circumferential flange members and extend radially outwardly from the first circumferential flange member and through the second circumferential flange member. In this embodiment the cooling air directing plate is connected to the second concentric flange member and the annular space between the flange members communicates with the air directing space defined by the air directing plate, the hub and the rotor in combination, to define a continuous cooling air directing path between the cooling air directing plate and the first and second concentric flange members. Also, the fan blades may be attached to the first and second circumferential concentric flange members and extend radially outwardly from the first circumferential flange member through the second circumferential flange member, and the cooling air directing plate may be attached to the second circumferential concentric flange member. In this embodiment the cooling air directing plate is attached by a snap fastener technique.

A method is also disclosed for cooling a motor, the motor having a cooling air path extending therethrough and having a plurality of fan blades fixed thereto for rotation such that an atmospheric pressure differential is defined by a higher pressure region on one side of the blades and a lower pressure region on the other side of the blades. The method comprises creating a substantially unimpeded air directing space on one side of the motor communicating the lower pressure region with the higher pressure region through the cooling air path in the motor. The motor has an axis of rotation and a hub fixed thereto for rotation. The fan blades extend radially outwardly from the hub such that when the fan blades are rotatably driven by the motor, the high pressure region is generally on the downstream side of the blades and the lower pressure region is on the upstream side of the blades.

In the preferred embodiment, the air directing space is created between a cooling air directing plate torsionally fixed to a rotor and spaced axially therefrom. The plate has a substantially continuous inner surface portion to thereby direct cooling air through in a direction generally transverse to the axis of the motor and in a substantially unimpeded manner.

BRIEF DESCRIPTION OF THE DRAWINGS

Preferred embodiments of the invention are described hereinbelow with reference to the drawings wherein:

FIG. 4 is an elevational cross-sectional view of another alternative embodiment of the invention, incorporating a fan rotor having a first flange formed of a single circumferential member, and a second concentric flange connected to a cooling air directing plate; and FIG. 5 is another view of the fan assembly shown in FIG. 4, taken along another cross-section to illustrate the method of retention for the air directing plate to the second concentric flange.

DETAILED DESCRIPTION OF TIE PREFERRED EMBODIMENTS

Figure 1:
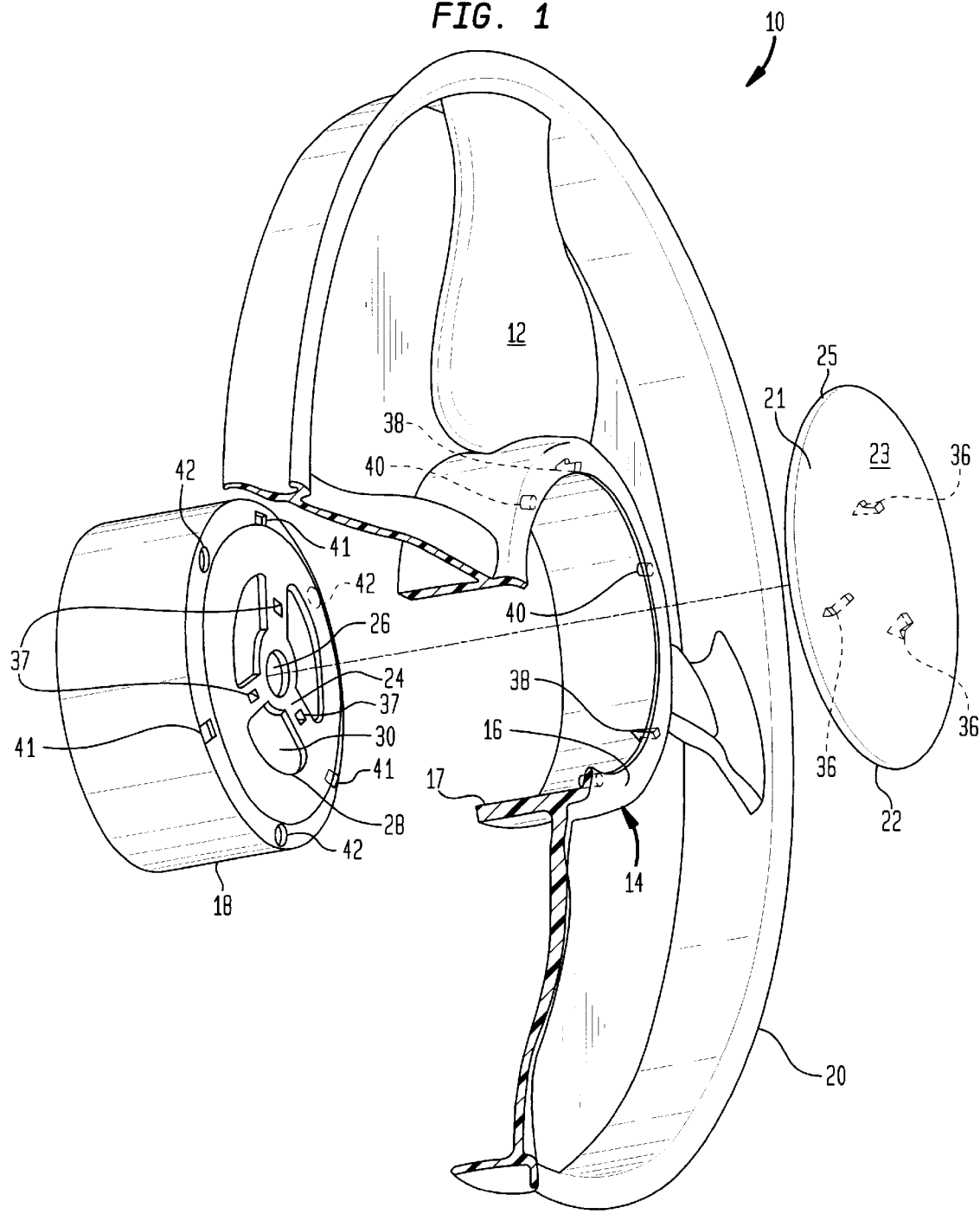
FIG. 1 is a perspective view, with parts separated and partially cut away for illustration purposes, of a preferred embodiment of a motor driven fan assembly constructed according to the present invention and mounted to a rotor of a brushless motor.

Referring initially to FIG. 1, there is shown a perspective view of a fan assembly 10 constructed according to the present invention, with fan blades 12 connected for rotation to a cylindrically shaped hub 14 which is mounted to rotor 18 of a brushless motor. One example of a type of brushless motor contemplated herein is disclosed in commonly assigned U.S. application Ser. No. 08/632,545, filed Apr. 19, 1996, the disclosure of which is incorporated herein and made part of this application. However, the fan assembly of the present invention can be utilized with any type of brushless motor or any type of air cooled motor.

In FIG. 1, hub 14 includes front face plate 16 and flange member 17 extending rearwardly along an axial direction from face plate 16. Flange member 17 provides a mounting base for fan blades 12, which are contemplated for use in cooling in limited space applications. One example of such limited space applications is an automotive cooling system. In the embodiment shown, the tips of the fan blades 12 are connected by a circumferential ring 20 which functions to stabilize the blades and the airflow passing thereby during rotation thus avoiding unnecessary aerodynamic blade tip vortices. Air directing plate 22 is configured as a flat plate having generally continuous smooth inner and outer surface portions 21 and 23, respectively, as shown. Further, the radially outwardmost portion 25 of plate 22 has an arcuately shaped cross-sectional configuration as shown, which is spaced from and concentric with the adjacent surface of flange member 17 to define a contoured configuration for the space defined therebetween. The air directing plate 22 is attached to the rotor 18 as will be described hereinafter. The rotor is generally made of a metal such as steel.

Figure 2:
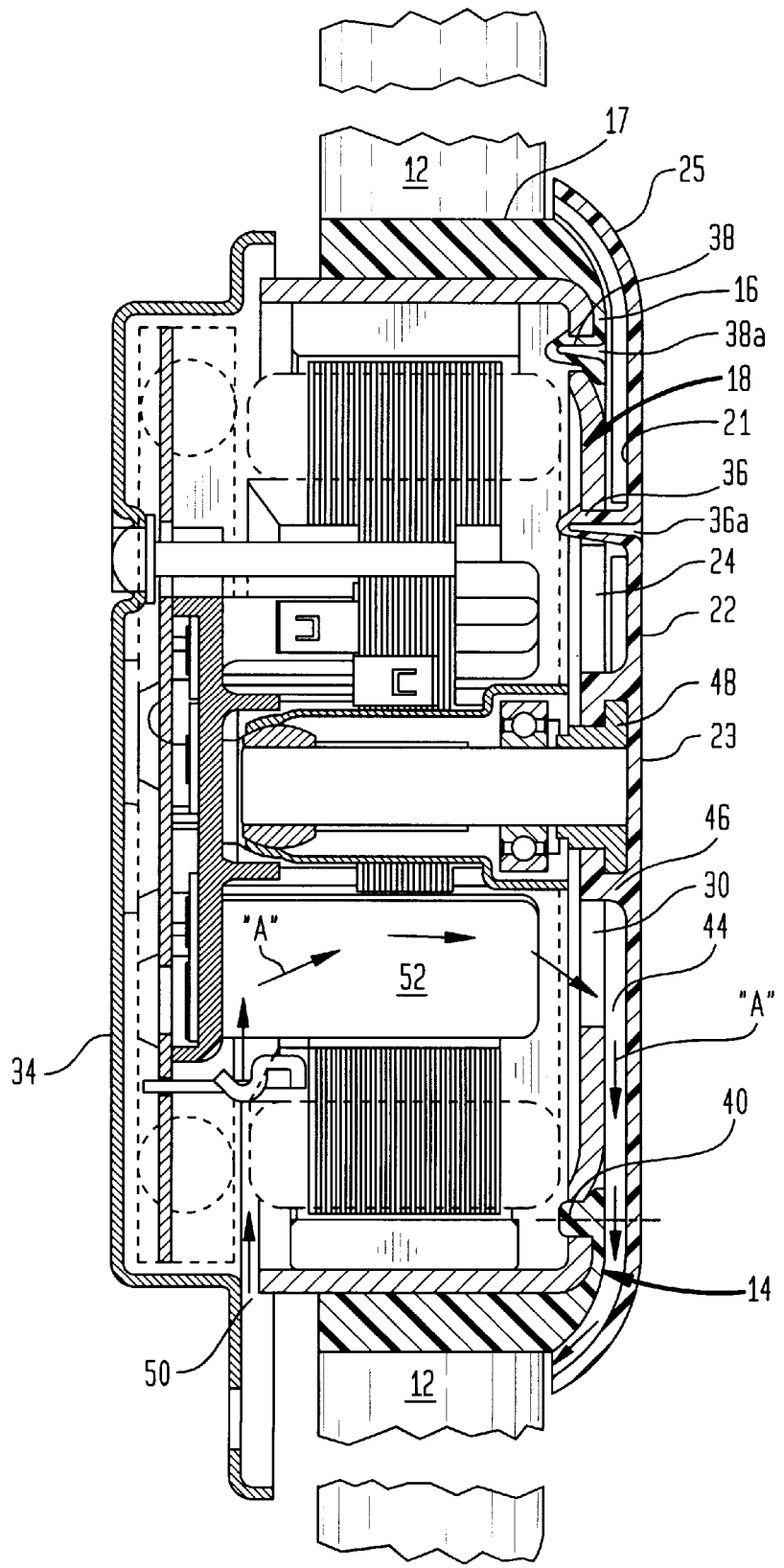
FIG. 2 is an elevational cross-sectional view of the fan assembly shown in FIG. 1, mounted to a complete brushless motor and illustrating the internal components of the motor.

Referring again to FIG. 1 in conjunction with FIG. 2, rotor 18 includes a central section formed of radially extending spoke-like ribs 24 extending from a central shaft mount opening 26 to the periphery of the larger circular opening 28. As can be seen, there are three such ribs 24 which are equally spaced to divide circular opening 28 into three individual equal openings 30 which are intended to permit cooling air to pass into the motor and past the internal components thereof. In FIG. 1, a portion of face plate 16 has been cut away for illustration purposes. Thus, in operation, the face plate 16 is mounted to the rotor 18 and rotates with the rotor, with the rotational torque being transferred to fan blades 12 and circumferential ring 20 to provide air flow over an object to be cooled, such as an automotive radiator.

Referring again to FIG. 2, there is illustrated a view partially in cross-section, of the hub 14 of FIG. 1 assembled to rotor 18. In FIG. 2, the entire housing, which includes rotor 18 and rear cover plate 34, is shown. Rotor 18 is structured to direct cooling air over the internal components of the brushless motor which are shown schematically in FIG. 2. Referring once again to FIG. 2, hub 14 includes face plate 16 and flange member 17 extending in a proximal direction from the face plate 16 and having an arcuately shaped outer surface at the joinder therebetween. In the embodiment shown in FIGS. 1 and 2, the flange 17 is formed of a single circumferential member to which fan blades 12 are attached. Circumferential flange 17 is preferably dimensioned to fit the rotor in contacting relation or with a predetermined press fitted relation.

In a preferred embodiment, three snap-fit lugs 38 are utilized to attach the hub 14 to the rotor 18 as shown, by inserting them into square apertures 41 and spacing them equally in a circular pattern over the face plate 16 as shown. Similarly, air directing plate 22 is attached to rotor 18 by snap-fit lugs 36 which are attached to air directing plate 22 and are inserted into square apertures 37 in the ribs 24 of rotor 18. Only one of such snap-fit lugs 36 is shown in the cross-sectional view of FIG. 2; the other snap-fit lug 38 shown in FIG. 2 is of the same type, but attaches the face plate 16 of hub 14 to rotor 18. Alternatively, more than three of such snap-fit lugs 36 and 38 may be utilized in each instance, depending upon the specific application. The air directing plate 22, the hub 14 and snap-fit lugs 36 and 38 are preferably fabricated of a resilient injection molded plastic material such as a polyester, nylon or the like. Also, snap-fit lugs 36 and 38 are configured to include axial slots 36a and 38a respectively, which are dimensioned to receive the tip of a screw driver (or other tool) to bend the lug rearwardly to relieve the snap lock for disassembling the components for repairs or the like.

As seen in FIG. 2, hub 14 is also attached to rotor 18 by three torque studs 40 (only one shown in FIG. 2). Torque studs 40 are dimensioned to be inserted and press fitted into the spaced circular apertures 42 in the face of rotor 18 as shown in FIG. 1, and are dimensioned and structured to transmit torque from the rotor 18 to fan base 14 and to contain the centrifugal force thus created by the rotating components. Alternatively, four or more of such torque studs 40 may be utilized, depending upon the application. In FIGS. 1 and 2, air directing plate 22 is positioned distally of face plate 16 and rotor ribs 24 as shown. As noted, the air directing plate 22 is connected directly to rotor ribs 24 by snap-fit lugs 36 of the type described, and is dimensioned to block the air cooling openings 30 in rotor 14 as shown in FIG. 1. In addition, air directing plate 22 defines radially extending transverse air directing space 44 shown by arrows "A", which communicates with the cooling air openings 30 in rotor 18. The air directing plate 22 is spaced distally from rotor 18 and face plate 16 of hub 14 by circular spacer 46 positioned about motor shaft support 48 and formed integrally with air directing plate 22 as best shown in FIG. 2. Although the air flow through the transverse air directing space is substantially unimpeded due to the continuous inner surface portion of the plate 22, a minor—or negligible— amount of interference to the air flow is provided by the snap-fit lugs 36.

In operation, when fan blades 12 are rotated by rotor 18 and hub 14 they create a substantial pressure gradient between the upstream and downstream atmospheres. In particular, the air pressure upstream of the fan blades is relatively low in comparison to the higher pressure downstream of the fan blades. Thus, the air is induced to flow from the area of highest pressure downstream of the fan blades through the motor via space 50 between rear cover plate 34 and rotor 18, and past heat sink fins 52 through the openings 30 in rotor 18. Thereafter, the air flows through the air directing space 44 defined by the air directing plate 22, the rotor 18, and the face plate 16 of hub 14. The air is thus induced to flow from the area of highest pressure downstream of the blades 12 to the area of lowest pressure upstream of the blades 12 as shown by the arrows "A" in FIG. 2.

In the last stage of the cooling air flow through the motor, the centrifugal force developed by rotation of the rotor 18 accelerates the flow of air within the air directing space under the surface of air conducting plate 22. In addition, with air conducting plate 22 in position over the cooling air openings 30 of rotor 18, particles, water, and dust are prevented from entering the interior of the motor.

In the embodiment shown in FIGS. 1 and 2, the cooling air is actually directed to pass by the fan blades 12 and therefore, circumferential or tangential forces are also imparted to the cooling air when exiting space 44 toward the lower pressure area. Thus, additional vortex activity is imparted to the air flow, creating an improved pattern of air circulation which promotes cooling of the motor components. As disclosed in commonly assigned pending application Ser. No. 08/632,545, the internal components of a brushless motor are generally closely spaced. Thus, cooling of the components is particularly required in such instances.

Figure 3:
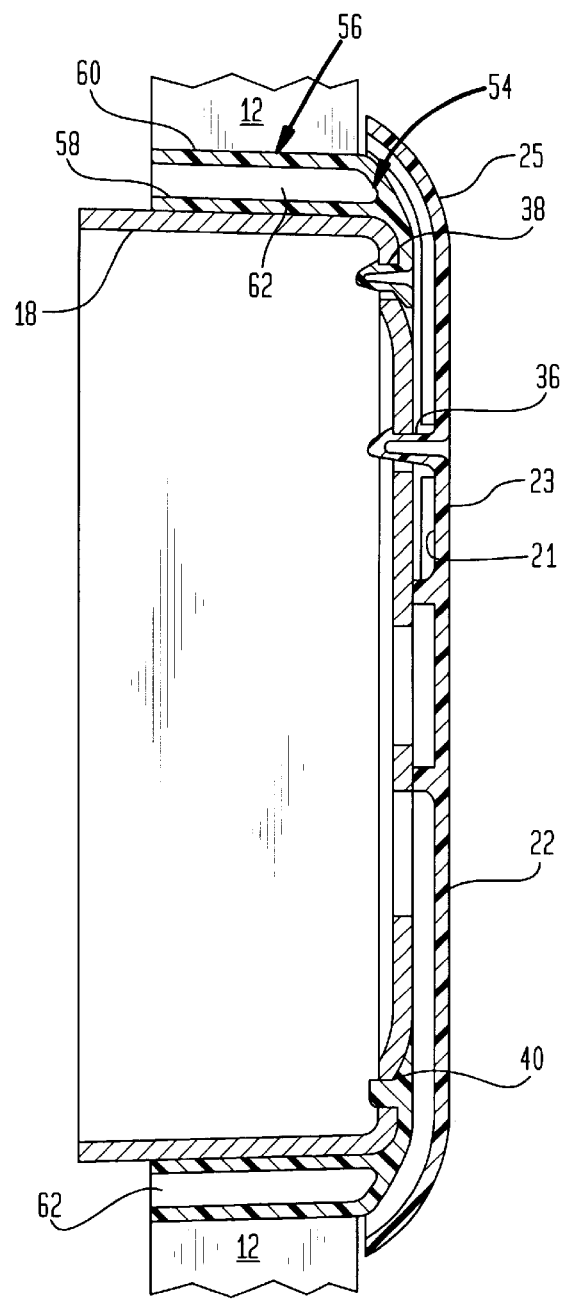
FIG. 3 is an elevational cross-sectional view of an alternative embodiment of the invention, mounted to the rotor of a brushless motor of the type shown in FIG. 2, and incorporating a flange comprised of dual concentric circumferential members with reinforcement ribs therebetween.
Figure 3A:
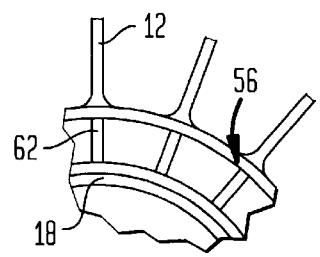
FIG. 3a is an end view of a portion of stiffener ribs of the invention of FIG. 3.

Referring now to FIG. 3, a cross-section of an alternative embodiment of the fan base is disclosed. In this embodiment, hub 54 includes flange 56 formed of two circumferential members, including a first inner flange 58 positioned about rotor 18 and preferably press fitted or snugly fitted thereon. A second circumferential flange 60 is spaced radially outwardly of first flange 58 and is concentric therewith so as to define a uniform annular space therearound as shown. A plurality of stiffener ribs 62 shown schematically in FIG. 3 are equally spaced apart circumferentially within the annular space between flanges 58 and 60 to provide stiffening support to the flanges to support blades 12. Blades 12 are connected to outer flange 58 in a manner similar to the connection of the blades to flange 17 shown in FIG. 1. In FIG. 3, air directing plate 22 is configured as in the embodiment of FIG. 2, having a central flat section with a substantially continuous inner surface portion 21 and a substantially continuous outer surface portion 23. The radially outwardmost portion 25 is arcuately shaped as in the previous embodiment.

Although the preferred embodiment in FIG. 3 illustrates four fan blades 12 as shown in FIG. 1, alternatively any number of blades may be utilized, depending upon the specific cooling application needed. Further, the use of dual concentric flanges 58 and 60, with stiffener ribs 62 therebetween facilitates a lighter weight hub with improved strength. Thus the lighter weight hub will, inter alia, permit the use of additional fan blades by compensating for the additional weight and dynamic forces added by the fan blades.

Referring again to FIG. 3, hub 54 is attached to rotor 18 by three snap lugs 38 as shown in the embodiment of FIG. 1. In addition, hub 54 is also torsionally fixed to rotor 18 by three torque studs 40 in the manner shown in FIGS. 1 and 2. Thus, the torque studs 40 serve to transmit torque from rotor 18 to hub 54 and to blades 12, thus containing the torque and centrifugal forces which are developed during rotation.

In the embodiment shown in FIG. 4, hub 64 includes face plate 66 and flange member 68 and is attached to rotor 18 by snap fittings 70 similar to lugs 38 and 40 in the previous embodiments. Concentric flange 72 is shown along the cross-section in FIG. 4 and is similar to the flanges disclosed previously so as to define an annular space 74 therebetween. In this embodiment the annular space 74 communicates with the air directing space 44 defined between air directing plate 76 and rotor 18 and hub 64. The fan blades 12 are attached directly to inner concentric flange member 68 which is connected to rotor 18 as shown. However, blades 12 also extend through the outer concentric flange 72 and are connected thereto by any of a number of known attachment techniques.

In addition to providing a means to generate air flow between concentric flanges 68 and 72, the blades 12 in this embodiment actually provide stiffening or strengthening support to the inner and outer flanges 68 and 72, thus minimizing the need for the support ribs 62 shown in the embodiment of FIG. 3. Alternatively, support ribs may be utilized as well in the embodiment of FIG. 4. Thus, although the flanges 68 and 72 are reduced significantly in thickness (and thereby, the weight as well) from the embodiment shown in FIG. 1, the connection between flanges 68 and 72 and blades 12 actually provides support and increased strength for the flanges, thereby justifying the reduction in flange thickness for weight purposes. As noted, blades 12 and hub 64 are molded from a resilient plastic material such as polyester, nylon or the like.

As noted, in the embodiment of FIG. 4, rotation of the blades 12 creates a flow pattern conducive to directing the cooling air through the cooling air path as previously described. However, in this embodiment, the cooling air actually passes over the blades from the cooling air directing space 44 between the cooling air directing plate 76 and the rotor 18 and hub 64 and thus creates a distinct and unique flow pattern. Thus this arrangement actually advances the cooling process by affecting the flow of cooling air passing through spaces 44 and 74, due to the additional acceleration provided by blades 12 to the air flow in the space.

Referring to FIG. 5, another cross-section of the embodiment of FIG. 4 is shown, of the hub 64 and cooling air directing plate 76. The connection of the second circumferential flange 72 with air directing plate 76 by resilient snap fastener 88 extending inwardly of air directing plate 76 is shown in this FIG. 5. Although only one snap fastener 88 is shown extending inwardly of air directing plate 76, there are actually three such fasteners spaced equally in the same manner as shown in the previous embodiments. Furthermore, although one torque stud 40 is shown in FIG. 5, to rotatably connect hub 64 with rotor 18, three such studs are utilized as in the previous embodiments. As noted previously, blades 12 are connected to the first flange 68 and extend through second outer circumferential concentric flange 72 to provide stability and strength to flanges 66 and 70.

It can be appreciated that in the embodiment shown in FIGS. 4 and 5, the outer flange 72, the method of attachment of the hub 64 and the cooling air directing plate 76 to the hub 18, are all operative in an identical fashion to the attachment devices utilized for the previous embodiment. In other respects the embodiment of FIGS. 4 and 5 is the same as the previous embodiments described.

We claim:

1. A motor driven fan assembly which comprises:

a) a hub having a plurality of fan blades extending radially outwardly therefrom and being constructed and arranged to be fixed to a motor for rotation, such that when the hub is rotatably driven, the fan blades create an atmospheric pressure differential defined by a higher pressure region downstream of the blades and a lower pressure region upstream of the blades, said hub further having an opening therein dimensioned and located to receive at least a portion of a rotor of the motor therein, the portion of the rotor having a cooling air opening therein which communicates with the higher pressure region; and b) a cooling air directing member mounted for rotation and positioned axially upstream of said hub and generally adjacent to said portion of said rotor to define an air directing space, wherein, when the rotor is coupled to the hub, said air directing space communicates said lower pressure region with said higher pressure region through the cooling air opening in the rotor to cool the motor.

2. The fan assembly according to claim 1, wherein said hub comprises a base plate adapted to be torsionally fixed to the motor for rotation therewith, and a circumferential flange extending proximally from said base plate in an axial direction, said circumferential flange being configured and dimensioned to circumferentially surround at least a portion of the rotor in adjacent relation therewith.

3. The fan assembly according to claim 2, wherein said fan blades are connected to said circumferential flange and extend radially outwardly therefrom.

4. The fan assembly according to claim 3, wherein the rotor has a plurality of radially extending members which define a corresponding plurality of openings therebetween which define said cooling air opening.

5. The fan assembly according to claim 4, wherein said cooling air directing member is a plate connected to the radially extending rib members.

6. The fan assembly according to claim 5, wherein said means to torsionally fix said hub to the motor comprises a plurality of torque studs to connect said hub to the rotor for rotation therewith.

7. The fan assembly according to claim 6, wherein said circumferential flange is comprised of a pair of circumferential concentric flange members, a first of said circumferential concentric flange members being configured and dimensioned to circumferentially surround at least a portion of the motor in adjacent contacting relation therewith, said second circumferential concentric flange member being spaced radially outwardly from said first circumferential concentric flange member to define an annular space therebetween.

8. The fan assembly according to claim 7, wherein said fan blades are attached to said second circumferential concentric flange member and extend radially outwardly therefrom.

9. The fan assembly according to claim 8, wherein said circumferential flange comprises a plurality of support ribs positioned between and connected to said first and second circumferential concentric flange members, said support ribs being spaced circumferentially with respect to each other to provide structural support for said circumferential concentric flange members.

10. The fan assembly according to claim 9, wherein said second circumferential concentric flange member defines at least a portion of a cooling air directing path with said cooling air directing plate and has an arcuately shaped cross-sectional configuration adjacent the connection with said hub to provide a contoured configuration for said cooling air directing path.

11. The fan assembly according to claim 10, wherein the radially outwardmost portion of said cooling air directing plate has an arcuately shaped cross-sectional configuration which is spaced from and concentric with said second circumferential concentric member to define a contoured configuration for said cooling air directing path.

12. The fan assembly according to claim 11, wherein said hub and said cooling air directing plate are molded of a plastic material.

13. The fan assembly according to claim 12, wherein said plastic material is a polyester.

14. The fan assembly according to claim 13, wherein said hub is connected to the motor by snap-fit lugs which are releasably connected to the rotor.

15. The fan assembly according to claim 2, wherein said circumferential flange comprises a first circumferential flange member and said fan blades are attached to said first circumferential flange member, and a second circumferential flange member being spaced radially outwardly of said first circumferential flange member and concentric therewith to define an annular space therebetween, said fan blades extending through said second circumferential flange member.

16. The fan assembly according to claim 15, wherein said hub is connected to the motor by snap-fit lugs which are releasably connected to the rotor.

17. The fan assembly according to claim 16, wherein said cooling air directing plate is connected to said second circumferential concentric flange member and said annular space communicates with said air directing space to define a continuous cooling air directing path between said cooling air directing plate and said first and second circumferential concentric flange members.

18. The fan assembly according to claim 17, wherein said first circumferential concentric flange member has an arcuately shaped cross-sectional configuration at the joinder with said base plate to provide a contoured configuration for said cooling air directing path.

19. The fan assembly according to claim 18, wherein said second circumferential concentric flange member is connected to said cooling air directing plate and has an arcuately shaped cross-sectional configuration at the joinder therewith.

20. The fan assembly according to claim 2, further comprising a second circumferential flange member concentric with said first mentioned circumferential concentric flange member, and said second circumferential concentric flange member is attached to said cooling air directing plate.

21. The fan assembly according to claim 20, wherein said fan blades are attached to said first and second circumferential concentric flange members and extend radially outwardly from said first circumferential concentric flange member through said second circumferential concentric flange member, and said cooling air directing plate is attached to said second circumferential concentric flange member by a resilient snap fastener.

22. A fan assembly to be driven by a brushless motor, the motor including a rotatable rotor and a stator which houses a heat sink portion for cooling the motor, the rotor having a plurality of radially extending rib members defining a corresponding plurality of cooling air openings which communicate with a cooling air path within the motor, the fan assembly comprising:

a) a hub having a base plate adapted to be torsionally fixed to the rotor for rotation therewith, said hub further having a cylindrically shaped flange member extending proximally from said base plate in an axial direction, and configured and dimensioned to circumferentially encircle at least a portion of the rotor in adjacent contacting relation therewith, said portion of the rotor including said cooling air openings;

b) a plurality of fan blades extending radially outwardly from said cylindrically shaped flange member for rotation with said base plate and the rotor, said fan blades being configured and oriented such that during rotation thereof, the fan blades create an atmospheric pressure region on one side thereof which is greater that the atmospheric pressure region on the other side of the fan blades; and c) a cooling air directing plate member torsionally fixed to the rotor and disposed generally adjacent to said portion of said rotor so as to define a radially extending cooling air directing space which communicates with the cooling air openings in the rotor whereby cooling air is directed from said region of greater pressure through the cooling air path within the motor and past the heat sink portion, and through the cooling air openings in the rotor so as to direct air to said region of lower pressure.

23. A fan assembly to be driven by a brushless motor, the motor including a rotatably driven rotor, a housing having cooling air openings which permit cooling air to pass through a cooling air path within the motor, and a heat sink portion within the housing for cooling the motor, the rotor having a plurality of radially extending rib members defining a corresponding plurality of openings which communicate with the cooling air path within the motor, which comprises:

a) a hub having a base plate adapted to be attached to the rotor for rotation therewith, said hub further having a first circumferential flange member extending proximally from said base plate in an axial direction, and configured and dimensioned to circumferentially encircle at least a portion of the rotor in adjacent contacting relation therewith;

b) a plurality of torque studs configured and positioned to torsionally fix said base plate to the rotor;

c) a plurality of fan blades attached to said circumferential flange member and extending radially outwardly therefrom for rotation with said hub and the rotor, said fan blades being configured and oriented such that during rotation, the atmospheric pressure downstream of said fan blades is greater than the atmospheric pressure upstream of said fan blades;

d) a cooling air directing plate positioned axially upstream of said hub to define an air directing space with the rotor, said air directing space communicating the lower pressure region with the higher pressure region through a cooling air path in the motor and said hub openings to cool the motor;

e) a second flange member connected to said cooling air directing plate and extending proximally therefrom in an axial direction, said second flange member being spaced radially outwardly from said first flange member and concentric therewith to define an annular space which communicates with said cooling air directing space defined by said cooling air directing plate and the rotor, said fan blades extending through said second flange member and connected thereto to strengthen said first and second flange members; and f) a releasable fastener to connect said cooling air directing plate to said second flange member.

24. In combination, a fan assembly and an air cooled brushless motor, the motor including a rotatable rotor and a stator which houses a heat sink device disposed in a cooling air path of the motor for cooing the motor, the rotor having a plurality of radially extending rib members defining a plurality of cooling air openings which communicate with the cooling air path within the motor, and a hub having a plurality of fan blades extending radially outwardly therefrom and fixed to the motor for rotation, such that when said hub is rotatably driven, said fan blades create and atmospheric pressure differential defined by a higher pressure region downstream of the blades and a lower pressure region upstream of the blades, said hub further having at least one opening receive at least a portion of the rotor which includes said cooling air openings and a cooling air directing plate coupled to one of said rotor and said hub and positioned axially upstream of the motor and generally adjacent to said portion of said rotor to define an air directing space with the motor and said hub which communicates said lower pressure region with said higher pressure region through the cooling air path in the motor and the cooling air openings in the rotor to cool the motor.

25. A method of cooling an electric motor wherein the motor has an axis of rotation and a cooling air path extending through the motor, the motor further having a hub fixed thereto and mounted for rotation, said hub having a plurality of fan blades extending radially outwardly therefrom such that when the fan blades are rotatably driven they create an atmospheric pressure differential defined by a higher pressure region on the downstream side of the blades an a lower pressure region on the upstream side of the blades, said hub further having an opening receiving at least a portion of a rotor of the motor, said portion of said rotor having at least one cooling air opening therein communicating with said cooling air path in the motor, the method comprising creating an air directing space axially upstream of the motor and generally adjacent to said portion of said rotor by providing an air directing member coupled to one of the hub and the rotor, and communicating said lower pressure region with said higher pressure region through the cooling air path in the motor via the cooling air opening in the rotor, at least a portion of said air directing space extending in a direction generally transverse to the axis of the motor.

26. The method according to claim 25 wherein the motor has an axis of rotation and includes a stator which houses a heat sink portion for cooling the motor, and said air directing space is defined between a cooling air directing plate torsionally fixed to said rotor and spaced axially therefrom, said plate having a substantially continuous inner surface portion to direct cooling air therethrough in a direction generally transverse to the axis of rotation and in a substantially unimpeded manner.

* * * * *